United States Patent [19]

Tsau et al.

[11] Patent Number: 5,114,726
[45] Date of Patent: May 19, 1992

[54] PROCESS FOR PREPARING ASPARTAME COATED ORGANIC ACID

[75] Inventors: Josef H. Tsau, Skokie; Dennis Seagle, Buffalo Grove; Steven Laurenz, Mt. Prospect, all of Ill.

[73] Assignee: The NutraSweet Company, Deerfield, Ill.

[21] Appl. No.: 700,731

[22] Filed: May 15, 1991

Related U.S. Application Data

[63] Continuation-in-part of Ser. No. 383,083, Jul. 25, 1989, abandoned, which is a continuation-in-part of Ser. No. 224,977, Jul. 27, 1988, abandoned.

[51] Int. Cl.$^5$ ............................................. A23L 1/236
[52] U.S. Cl. .................................... 426/289; 426/548; 426/96; 426/291; 426/294; 426/295
[58] Field of Search ................. 426/548, 285, 96, 289, 426/291, 294, 295

[56] References Cited

U.S. PATENT DOCUMENTS 4,554,167 11/1985 Sorge et al. .................. 426/285
4,752,485 6/1988 Sharma et al. ................ 426/99

OTHER PUBLICATIONS

Unexamined Japanese Application No. 63158/84 (59-63158), published Apr. 10, 1984, 4 pages.

*Primary Examiner*—Joseph Golian
*Attorney, Agent, or Firm*—Jeffrey M. Hoster

[57] ABSTRACT

A coated consumable product and process for manufacturing such a product are disclosed. The product comprises aspartame and citric acid or malic acid made by use of a process which produces a substantially pure, dust-free, free-flowing, easily dissolvable product.

6 Claims, No Drawings

PROCESS FOR PREPARING ASPARTAME COATED ORGANIC ACID

This application is a continuation-in-part of application Ser. No. 07/383,083, filed on Jul. 25, 1989, and now abandoned, which is a continuation-in-part of application Ser. No. 07/224,977, filed on Jul. 27, 1988, now abandoned, the disclosure of which is incorporated herein by reference.

BACKGROUND OF THE INVENTION

This invention relates to methods of making consumable products having a coating. More particularly, the invention relates to such products where an artificial sweetening agent comprises one of the ingredients.

It is often difficult to use aspartame, or blends of aspartame and other sweetening agents, in desirable products. For purposes of this application, sweetening agents shall include, but not be limited to, high potency sweeteners such as saccharin, cyclamates, acesulfam-K, trichlorogalactosucrose (TGS, Sucralose), and alitame, as well as sweeteners such as sucrose, high fructose corn syrup, and dextrose. Appearance, chemical and physical instability, potency, and handling and manufacturing difficulties may reduce the applicability of aspartame, particularly in powder form. The lack of utility of artificial sweetening agents is especially evident when dust-free, free-flowing, fast-dissolving and fast-release requirements are present.

Uses of aspartame are particularly limited, as bulk aspartame is a slow-dissolving dusty powder made up of needle shaped crystalline particles having static and poor flow characteristics. The beverage industry is concerned about waste due to dust and slow dissolution of aspartame. Loss of the aspartame may occur as dust is lost into the air and absorbed onto the surfaces of equipment and containers during manufacturing, transportation, handling, and use.

It is particularly difficult to use aspartame in connection with citric acid, especially for use with powder drink products. Citric acid is highly soluble and a small amount of water turns citric acid powder or granules into an unworkably sticky mass. Thus, many conventional granulation methods, such as mixing granulators and fluid-bed granulators, cannot granulate or coat compositions containing relatively high amounts of citric acid.

Further, since citric acid is highly acidic, it is not compatible with aspartame under wet and/or heat conditions. When large amounts of water are added in a conventional granulation method, significant dissolution results. Water and alcohol undergo strong hydrogen bonding interactions with citric acid and aspartame. The removal of water, even under mild conditions, conventionally results in some degradation of aspartame and citric acid. The extent of process induced degradation is proportional to the amount of water used in the process, its heating temperature and time.

Conventional granulation and coating methods in which a suspension or solution is formed, result in the above discussed problems. Similarly, products containing mainly citric acid and aspartame produced by these methods result in a slow rate of dissolution.

Thus, there is a need to provide a product and a process to make such a product including aspartame in a form in which the aspartame may be used for desired applications with citric acid or malic acid. It is an object of this invention to provide such products and processes.

SUMMARY OF THE INVENTION

The invention of the present application is a process for producing a product containing aspartame and citric or malic acid. The product produced by the inventive process has a low level of impurities and is dust-free, free-flowing, and easily dissolvable.

In the process, aspartame is added to a granulator/mixer and then wetted by spraying a measured amount of water and mixing. Granular citric acid is then added and mixed with the wetted aspartame. The mixture is then heated and mixed within a carefully selected temperature range to coat aspartame on citric acid, and the resulting product is dried.

DETAILED DESCRIPTION OF THE PREFERRED EMBODIMENT

A preferred embodiment is a process in which properly wetted aspartame and citric acid or malic acid are mixed and heated in a manner to produce an aspartame coated granular product having a low level of impurities which is substantially dust-free, free-flowing and easily dissolvable. The desired product is preferably manufactured using the following process in which a product is produced which is substantially free-flowing, fast dissolving, and dust-free, characteristics which are unexpected in light of the typical uses of the particular equipment. A coater is used, with a preferred coater being a granulator/mixer such as Mixmill® manufactured by Processall. The coater may also be a granulator such as a Vector Corporation CF360® granulator or a pan coater equipped with a binder solution spraying nozzle, coating powder feeder, and hot air duct for drying.

The aspartame is preferably prewetted with an amount of water or other binder solution and mechanically mixed with the granular substance and are preferably heated during the mixing step to achieve the coating of the powder on the granules. However, the heating must be conducted under carefully maintained parameters.

The granulator/mixer process is preferred for coating highly soluble granules with sparingly soluble or insoluble powder to prevent aggregation. This is beneficial especially in the production of an aspartame/citric acid product.

In another process, a coating pan equipped with a binder solution spraying nozzle, a powder feeder, and a hot air duct for drying is used. The granular substance is fluidized in a rotating pan and wetted by a binder solution or suspension which is added by an atoxized nozzle. The artificial sweetening agent in powder form is then added to coat the wet granule.

The artificial sweetening agent is added in powder form which is preferably smaller than about 75 microns. The action of the coater and the effect of the binder combine to produce particles in which the substance is coated by the artificial sweetening agents in a form not typically conducive to such coating, for example, crystalline aspartame, results in a relatively smooth coating. Under a xicroscope, the long crystals of the aspartame were not observed. While not wishing to be bound by theory, it appears that the granular substance serves as an efficient ball mill to micronize particles of the sweetening agent. The micronized particles form a smooth, rapidly dissolvable coating. It appears that the granules provide a large surface area for immediate liquid contact which increases the dissolution rate of the artificial sweetening agent.

The product may be used to sweeten a variety of beverages which contain both aspartame and citric acid, such as lemon-lime beverages, and dry powder products such as powder drinks and lemon tea mix. The product will minimize waste due to dust.

In the preferred process, aspartame is added to the granulator/mixer (e.g., Mixmill) in powder form (for purposes of this application, powder form shall be considered as an average particle size less than about 75 microns). The aspartame is wetted by adding water to the granulator/mixer. The ratio of water to aspartame should be in the range of 0.5-2.5% by weight of the aspartame/citric acid product. Especially preferred is a range of 0.5-1.0%. Citric or malic acid, in granular form, is then added to the granulator/mixer. The mixture is then heated by a hot water jacket having a temperature preferably about 70°-100° C., typically for 10-30 minutes. The mixture is heated to a preferred temperature between 44°-52° C.; before the temperature of the mixture reaches 60° C., the coated product is gently dried, e.g. in a fluid-bed dryer to a moisture level of 1% or less.

If it is desired to add other sweeteners and flavors, such addition may occur simultaneously with the addition of the aspartame.

A granular citric acid-aspartame product may also be produced by the following process. This process may produce acceptable product in small quantities. In a granulator such as a Vector Corporation CF360° granulator, granular citric acid is fluidized in a rotating bed and heated by slit air at a temperature between about 65°-75° C. A solution of citric acid and water can then be sprayed on the granules while aspartame powder is added. The coated granules can then be dried at temperatures not exceeding 50° C.

The resulting aspartame coated organic acid granular product includes less than 2% process induced degradation products.

The following examples teach the manufacture of various products of the invention. The examples are not intended to limit the scope of the invention.

Example 1 - Citric Acid-Aspartame Product (Produced with Drying)

A granulator/mixer (140 liter Mixmill, manufactured by Processall) equipped with a nozzle sprayer was used. 13 kg aspartame was added to the equipment and wetted by spraying 0.375 kg of water while mixing. Then 24 kg of granular citric acid was added and mixed with the wetted APM. The mixture was heated by a hot water jacket for about 20 minutes to about 110° F. and discharged into a fluid-bed dryer and dried at an inlet temperature of 50° C. for 60 minutes and then sieved on an 80 mesh screen to remove fines. The resulting product contained about 30% aspartame, and had minimal levels of degradation products (0.04% α-aspartyl phenylalanine, 0.03% diketopiperazine).

Example 2 - Granular Citric Acid-Aspartame Product

In a Vector Corporation CF 360 ® granulator, 1000 g of fine granular citric acid was fluidized in a rotating bed and flushed with slit air at 70° C. A solution of 50% citric acid and 50% water was sprayed on the granules through an atomized nozzle at a rate of 20 ml/minute. Simultaneously, 350 g of aspartame powder was added via a screw feeder at a rate of about 100 g/minute. Following this addition, the coated granules were dried in the equipment for about 10 minutes and then dried in a tray dryer at 45° C. for 2 hours, The product contained 24% aspartame and was substantially free-flowing, dust-free, and rapidly dissolvable.

Example 3 - Citric Acid - Aspartame Product (No Drying)

A granulator/mixer (140 liter Mixmill ®, manufactured by Processall) equipped with a powder feeder was used. 28 lb (12.7 kg) of aspartame was added to the granulator/mixer and wetted by spraying 2.1 lbs (1.0 kg) of water into the powder while mixing. 75 lbs (34.0 kg) of granular citric acid was mixed with the wetted aspartame. The mixture was heated with a steam jacket to 112° F. (44° C.). An additional 5 lb. (2.3 kg) dry aspartame powder was quickly added to the mixture through a powder feeder. The product was discharged when the temperature in the mixer/granulator reached about 125° F. (52° C.). The product was sieved through an 80 mesh screen to remove excess powder.

What is claimed is:

1. A process for producing a substantially free-flowing, dust-free, fast-dissolving consumable product including an organic acid selected from the group consisting of citric acid and malic acid, and aspartame, comprising the steps of:
   adding aspartame powder to a coater and spraying water into said coater to wet said aspartame while mixing, said water added in an amount of from about 0.5%-2.5% by weight of the product;
   adding granular organic acid to said coater, said organic acid blended with said aspartame and heated by a water jacket to a temperature of between about 44° C. to about 52° C.;
   and discharging particles including aspartame coated organic acid from said coater before the temperature of said particles reaches 60° C.

2. The process of claim 1 further comprising the step of drying said particles at a temperature to a moisture level of 1 % or less.

3. The process of claim 1 further comprising the step of sieving said particles including aspartame and organic acid through a screen.

4. The process of claim 1 wherein said consumable product includes a sweetener in addition to aspartame.

5. The process of claim 1 wherein said water is added in an amount of from about 0.5%-1% by weight of the product.

6. The process of claim 1 wherein said organic acid is citric acid.

* * * * *